United States Patent
Clow et al.

(10) Patent No.: US 10,055,811 B2
(45) Date of Patent: Aug. 21, 2018

(54) SYSTEM AND METHOD FOR GENERATING INTERACTIVE 2D PROJECTION OF 3D MODEL

(71) Applicant: Caterpillar Inc., Peoria, IL (US)

(72) Inventors: Jason Paul Clow, Pekin, IL (US); Bjorn Eric Westlund, Naperville, IL (US); Steven Daniel Cherewick, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 92 days.

(21) Appl. No.: 15/152,872

(22) Filed: May 12, 2016

(65) Prior Publication Data
US 2017/0330305 A1    Nov. 16, 2017

(51) Int. Cl.
*G06T 15/10*  (2011.01)
*G06T 3/00*  (2006.01)

(52) U.S. Cl.
CPC ............ *G06T 3/0031* (2013.01); *G06T 15/10* (2013.01); *G06T 2207/10028* (2013.01); *G06T 2207/20068* (2013.01); *G06T 2207/20108* (2013.01)

(58) Field of Classification Search
None
See application file for complete search history.

(56) References Cited

U.S. PATENT DOCUMENTS

| | | | |
|---|---|---|---|
| 6,654,027 B1 | 11/2003 | Hernandez | |
| 6,965,846 B2 | 11/2005 | Krimmer | |
| 8,060,835 B2 | 11/2011 | Newcomer et al. | |
| 8,477,154 B2 | 7/2013 | Davis et al. | |
| 2004/0030788 A1* | 2/2004 | Cimo | H04L 63/0227 709/229 |
| 2013/0174110 A1* | 7/2013 | Durkan | G06F 17/5081 716/112 |
| 2014/0104266 A1* | 4/2014 | Stone | G06F 17/50 345/419 |
| 2014/0240466 A1* | 8/2014 | Holz | G06K 9/00355 348/47 |
| 2015/0073578 A1 | 3/2015 | Anthipagulu et al. | |
| 2016/0239584 A1* | 8/2016 | Steele, Jr. | G06F 17/50 |
| 2017/0208502 A1* | 7/2017 | Ho | H04W 28/085 |

FOREIGN PATENT DOCUMENTS

WO    2014127338    8/2014

OTHER PUBLICATIONS

Teamcenter 10.1 Getting Started with Product Visualization, 2013, http://help.aviacons.ru/tc10doc/PDF/en_US/tdocExt/pdf/getting_started_visualization.pdf.*

* cited by examiner

*Primary Examiner* — Frank Chen
(74) *Attorney, Agent, or Firm* — SmithAmundsen (57) ABSTRACT

A method for generating an interactive 2D projection of a 3D model includes steps of applying hierarchical defect data to the 3D model of a multi-part object, generating heatmap data based at least in part on the hierarchical defect data, and overlaying the heatmap data on the 3D model. The method also includes steps of extracting data corresponding to the 3D model and including the heatmap data after the overlaying step, and creating the interactive 2D projection based on the extracted data.

20 Claims, 8 Drawing Sheets

SYSTEM AND METHOD FOR GENERATING INTERACTIVE 2D PROJECTION OF 3D MODEL

TECHNICAL FIELD

The present disclosure relates generally to 3D and 2D views of a multi-part object, and more particularly to a system and method for translating a 3D model to at least one interactive 2D projection.

BACKGROUND

Companies commonly utilize computer software applications during product development and analysis. For example, many software products are currently available for creating and manipulating 3D models of a manufactured or assembled product. The 3D model can be used for a number of purposes, including for the visualization of defects or other data, such as by overlaying heatmap data, or other data, on the 3D model. Oftentimes, the product includes a plurality of parts and/or assemblies, increasing the complexity of the data to be displayed.

Additional views, including 2D views, are also useful during the lifecycle of the product. Although mathematical models exist for calculating 2D views from a 3D model, they often are not optimal and require additional manual development or manipulation, which is not re-usable. This additional time and expense in the development process is highly inefficient.

U.S. Pat. No. 6,965,846 to Krimmer discloses a method for generating a 2D view of a 3D model. According to the method, a test is made to determine whether or not a predefined 2D representation of the object is available for the 2D representation. If so, the predefined 2D representation is used in the 2D view; if not, a 2D projection of the object is calculated and used in the 2D view. However, accuracy of the 2D projection is questionable, at best.

SUMMARY OF THE INVENTION

In one aspect, a method for generating an interactive 2D projection of a 3D model includes steps of applying hierarchical defect data to the 3D model of a multi-part object, generating heatmap data based at least in part on the hierarchical defect data, and overlaying the heatmap data on the 3D model. The method also includes steps of extracting data corresponding to the 3D model and including the heatmap data after the overlaying step, and creating the interactive 2D projection based on the extracted data.

In another aspect, a system for generating an interactive 2D projection of a 3D model includes at least one processing device programmed for executing multiple steps. The steps include applying hierarchical defect data to the 3D model of a multi-part object, generating heatmap data based at least in part on the hierarchical defect data, and overlaying the heatmap data on the 3D model. The steps also include extracting data corresponding to the 3D model and including the heatmap data after the overlaying step, and creating the interactive 2D projection based on the extracted data.

In yet another aspect, a method for generating an interactive 2D projection of a 3D model is performed by one or more processing devices and includes a step of applying manufacturing metadata to the 3D model of a multi-part object. The method also includes steps of generating heatmap data based at least in part on the manufacturing metadata, overlaying the heatmap data on the 3D model, and extracting data corresponding to the 3D model and including the heatmap data after the overlaying step. The interactive 2D projection is created based on the extracted data.

DETAILED DESCRIPTION

Figure 1:
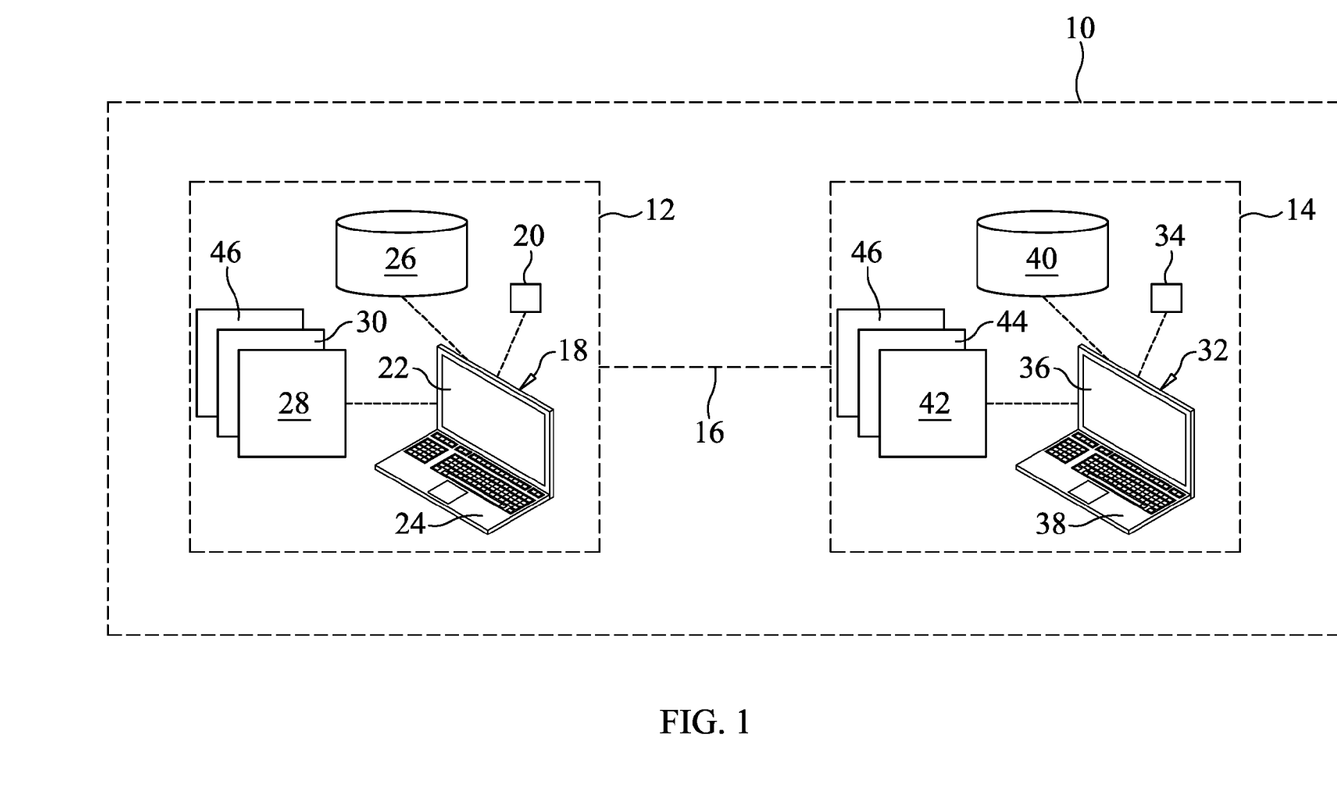
FIG. 1 is a block diagram of an exemplary system for generating an interactive 2D projection of a 3D model, according to one embodiment of the present disclosure.

Turning first to FIG. 1, an exemplary system for generating an interactive 2D projection of a 3D model is shown generally as a system at 10. The system 10 may include a variety of components, including various combinations of hardware and software, which can be configured to generate and/or utilize 2D and 3D views. In particular, the system 10 can be configured to utilize data visualization technologies to create, view, manipulate, modify, or gather data from 2D and/or 3D views of objects, including multi-part objects. Although an exemplary embodiment is described, the scope of the present disclosure should not be unduly limited.

The system 10 may include a first computer system 12 and a second computer system 14. Although two computer systems are shown, the system 10 may include only one computer system or more than two computer systems. The first computer system 12 and the second computer system 14 may have similar architectures, as shown, but it is not required. The first computer system 12 and the second computer system 14 are capable of sharing or transmitting data. For example, the first computer system 12 and the second computer system 14 may communicate over a wired and/or wireless communication line 16 and/or may be coupled via a network, such as, for example, a local area network, a wide area network, or a combination thereof. According to some embodiments, the first computer system 12 and the second computer system 14 may be located in an enterprise environment and may be remote from one another.

The first computer system 12 may include a first computer device 18, which may include one or more first processing devices 20, also referred to as processors, a first computer display 22, and at least one user input device 24. A first database 26, which includes hardware and software, or another similar electronic storage device, may be provided, internal and/or external relative to the first computer device 18 for storing various data that may be utilized or accessed by the first computer device 18. In an embodiment, the first database 26 or other electronic storage device can comprise a volatile memory or a non-volatile memory.

A first data visualization software program 28 may be operated on the first computer system 12 and may be configured for displaying a 3D model 30 on the first computer display 22. As should be appreciated, the first data visualization software program 28 may be stored on a non-transitory tangible computer-readable medium, which may be located on the first computer system 12. The first data visualization software program 28 may be stored on the first database 26 or other electronic storage device. According to the present disclosure, software, or programming code, may be provided on, accessed by, and/or executed on the first computer device 18, by the first processing device 20, to create, manipulate and/or access one or more online 3D models, such as 3D model 30. According to a specific example, the first data visualization software program 28 may include Teamcenter® Product Lifecycle Management (PLM) software, commercially available from Siemens. However, product lifecycle management software applications from Oracle, SAP and other software providers are also contemplated by this disclosure.

The second computer system 14 may include a second computer device 32, which may generally include one or more second processing devices 34, also referred to as processors, a second computer display 36, and at least one user input device 38. A second database 40, which includes hardware and software, or another electronic storage device, may be provided, internal and/or external relative to the second computer device 32 for storing various data that may be utilized or accessed by the second computer device 32.

A second data visualization software program 42 may be operated on the second computer system 14 and may be configured for displaying one or more interactive 2D views 44, such as interactive 2D views of the 3D model 30 referenced above, on the second computer display 36. As should be appreciated, the second data visualization software program 42 may be stored on a non-transitory tangible computer-readable medium, which may be located on the second computer system 14. The second data visualization software program 42 may be stored on the second database 40 or other electronic storage device. According to the present disclosure, software, or programming code, may be provided on, accessed by, and/or executed on the second computer device 32, by the second processing device 34, to create, manipulate and/or access one or more online 2D views, such as the interactive 2D view(s) 44 disclosed herein. According to a specific example, the second data visualization software program 42 may include Tableau® data visualization software, available from a company of the same name.

Figure 2:
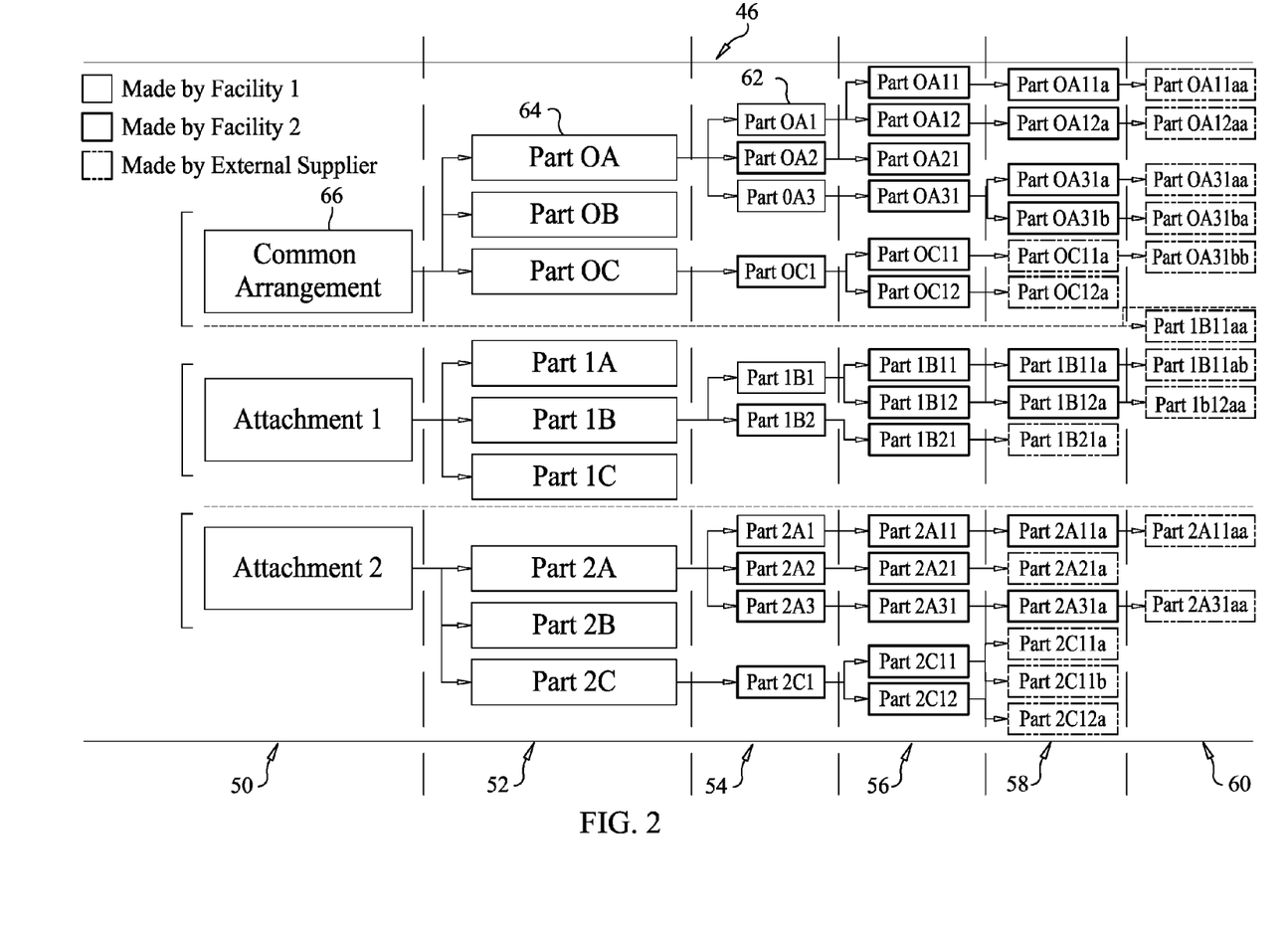
FIG. 2 is an exemplary chart of a bill of materials used in applying hierarchical defect data to the 3D model referenced in FIG. 1, according to one aspect of the present disclosure.

One or both of the first and second data visualization software programs 28 and 42 may include, reference, access, or utilize data from a bill of materials 46, such as a manufacturer's bill of materials. An exemplary bill of materials 46 is shown in FIG. 2. In particular, the bill of materials 46 reflects parts, including part numbers, of a multi-part object in a hierarchical manner. According to this hierarchy, the parts are organized into tree-like structures, with each child record typically having only one parent, whereas each parent record typically can have one or more child records. To access part information from the tree-like structure the whole tree needs to be traversed starting from a root. For example, the highest, or root, level is shown at 50, while child, grandchild, great-grandchild, etc. levels are shown respectively at 52, 54, 56, 58 and 60.

According to the present disclosure, the bill of materials 46, or other similar materials or references, may include defect data. That is, a part, referenced by a unique part number, may be identified as having a defect. As will be described below, defects may be aggregated up the tree of the bill of materials 46. For example, if a part referred to as Part OA1, shown at 62, is identified as having a defect, a defect count will increase for the Part OA1 (62), its parent part, a Part OA (64), and its grandparent part, referenced as a Common Arrangement (66). The bill of materials 46, the part numbers, and the defect identifications may be used to extract defect count information for each part, and all of its parent parts (all the way up the chain), to create defect metadata within the first data visualization software program 28. Defect metadata may be one example or subset of manufacturing metadata, with the present disclosure being broadly applicable to manufacturing metadata. Manufacturing metadata is data that exists to help define and understand the characteristics, traits and use of manufacturing items.

Figure 3:
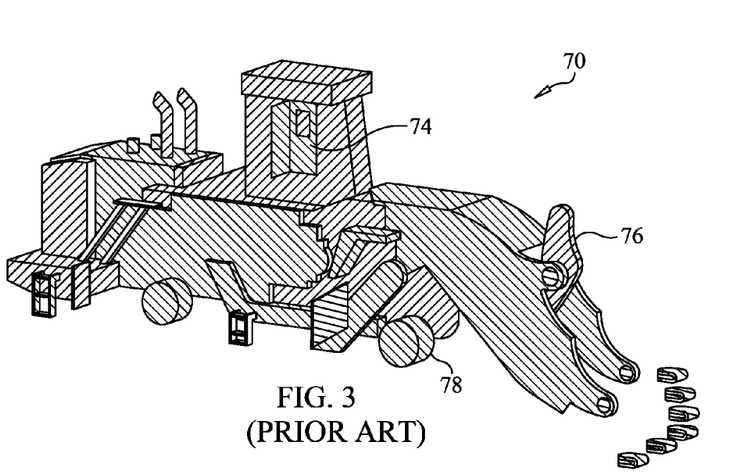
FIG. 3 is an exemplary embodiment of a prior art 3D model of a multi-part object with heatmap data overlaid thereon.
Figure 4:
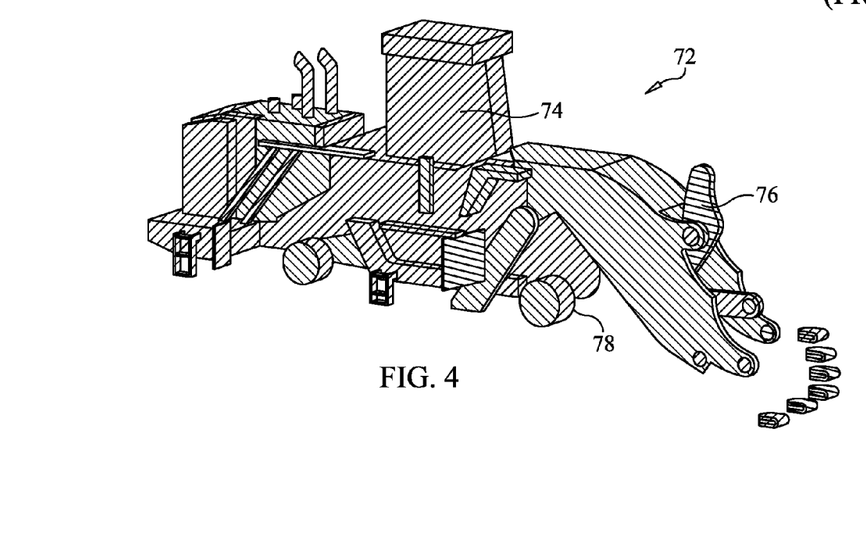
FIG. 4 is an exemplary embodiment of a 3D model of a similar multi-part object with heatmap data applied, generated according to the teachings disclosed herein.

Turning now to FIGS. 3 and 4, 3D models generated by the first data visualization software program 28 are shown. Each 3D model is shown with heatmap data overlayed on the 3D model, with different shading representing different defect counts, or different levels of defect counts. According to other examples, any indicators, including color, may be used to differentiate the different levels of defect counts. For example, a part having 1 defect may be represented with a first shading; a part having 2-9 defects may be represented with a second, different shading; and a part having 10+ defects may be represented with a third shading, different from both the previous two shadings used. According to the prior art 3D model 70, defect data is only applied to individual parts, without taking into account the hierarchical relationship of the defect data, as described above. This leads to incorrect data counts and, thus incorrect color (or shading) representations when the heatmap data is applied. Further, the prior art method results in many false positives due to lack of validation of the parent/child structure in the bill of materials 46.

According to the method disclosed herein, and referencing FIG. 4, defect counts may be applied to child/parent pairs, and not to just individual parts. That is, the present method traverses the entire bill of materials 46 from the part identified as having a defect to its top most parent part, allowing the reflection of defects, or defect levels, in the heatmap data to focus on systemic issues. For example, FIG. 4 depicts a 3D model 72 with heatmap data applied according to the teachings of the present disclosure. Note discrepancies between the two 3D models 70 and 72 called out at 74, 76 and 78.

Figure 5:
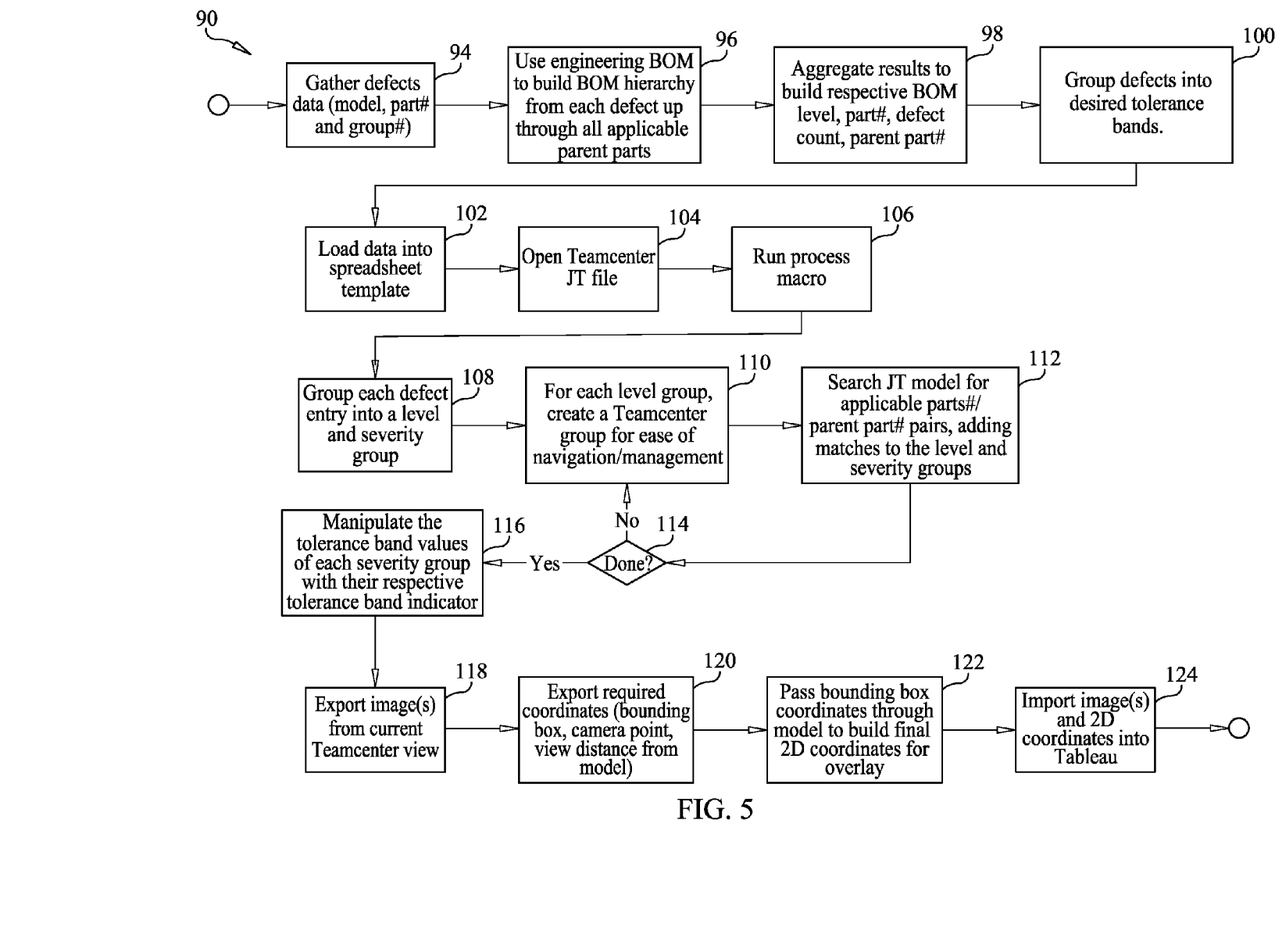
FIG. 5 is a flow diagram illustrating an exemplary method for generating an interactive 2D projection of the 3D model, according to the present disclosure.

Turning now to FIG. 5, but referring also to the previous FIGS., an exemplary method for generating an interactive 2D projection of a 3D model is shown using flow diagram 90. The method steps may be implemented in whole or in part by the system 10 of FIG. 1. In particular, parts of the method may be implemented using one or both of the first data visualization software program 28 and the second data visualization software program 42. The method may be implemented automatically and/or manually, and may run continuously, intermittently, or at predetermined intervals.

At Block 94, defect data is gathered, which may include model information, part number, and group number, for example. At Block 96, the bill of materials 46 may include or may be used to build a bill of materials defect hierarchy, up through all applicable parent parts, as described above. The results are then aggregated to arrive at data including a bill of materials level, such as levels 50-60, part number, defect count, and parent part number, as shown at Block 98. At Block 100, the defects may be grouped into desired tolerance bands or levels. That is, as described above, it may be desirable to depict a part having 1 defect with a first shading or color; depict a part having 2-9 defects with a second shading or color; and depict a part having 10+ defects with a third shading or color.

At Block 102, the hierarchical defect data may be loaded into a spreadsheet template for use by the first data visualization software program 28. At Block 104, and according to the exemplary embodiment, a visualization format file (e.g., a Teamcenter® JT file) may be opened, and, at Block 106, a process macro may be initiated, or another set of instructions applying the defect data to the first data visualization software program 28 may be initiated, with the process being automated in some instances. Each defect entry may be grouped into a level and/or severity group, at Block 108, and, at Block 110, according to the exemplary embodiment, a Teamcenter® group may be created for each level group for ease of navigation and management.

At Block 112, the JT model or file, referenced above, may be searched for applicable part and parent part pairs, adding matches to the level and severity groups. This Block 112 and Block 110 may be repeated until the method determines whether all of the defect data has been processed, as determined at Block 114. At Block 116, each the data may be further manipulated, to include an appropriate color, or other indicator, for applying to the 3D model. That is, the heat map data, described above, may be correctly stored on the JT file, for example. This heatmap data, generated based at least in part on the hierarchical defect data, may be overlayed on the 3D model 72, as shown in FIG. 4.

Next, at Block 120, the required data is exported from the first data visualization software program 28, or first computer system 12 in general, for use by the second data visualization software program 42, or the second computer system 14. This data may include bounding box data, camera point data, and camera-to-solid model distance, as will be discussed below. At Block 122, the bounding box data, or coordinates, may be passed through a model, disclosed herein and discussed below, to be used for creating the interactive 2D projection. Also used for creating the interactive 2D projection may be one or more images and 2D coordinates for each part. In particular, and according to the exemplary embodiment, the information may be exported to the second data visualization software program 42, which, for example, may be Tableau®. The process, of course, may loop or transition to another flowchart.

Figure 6:
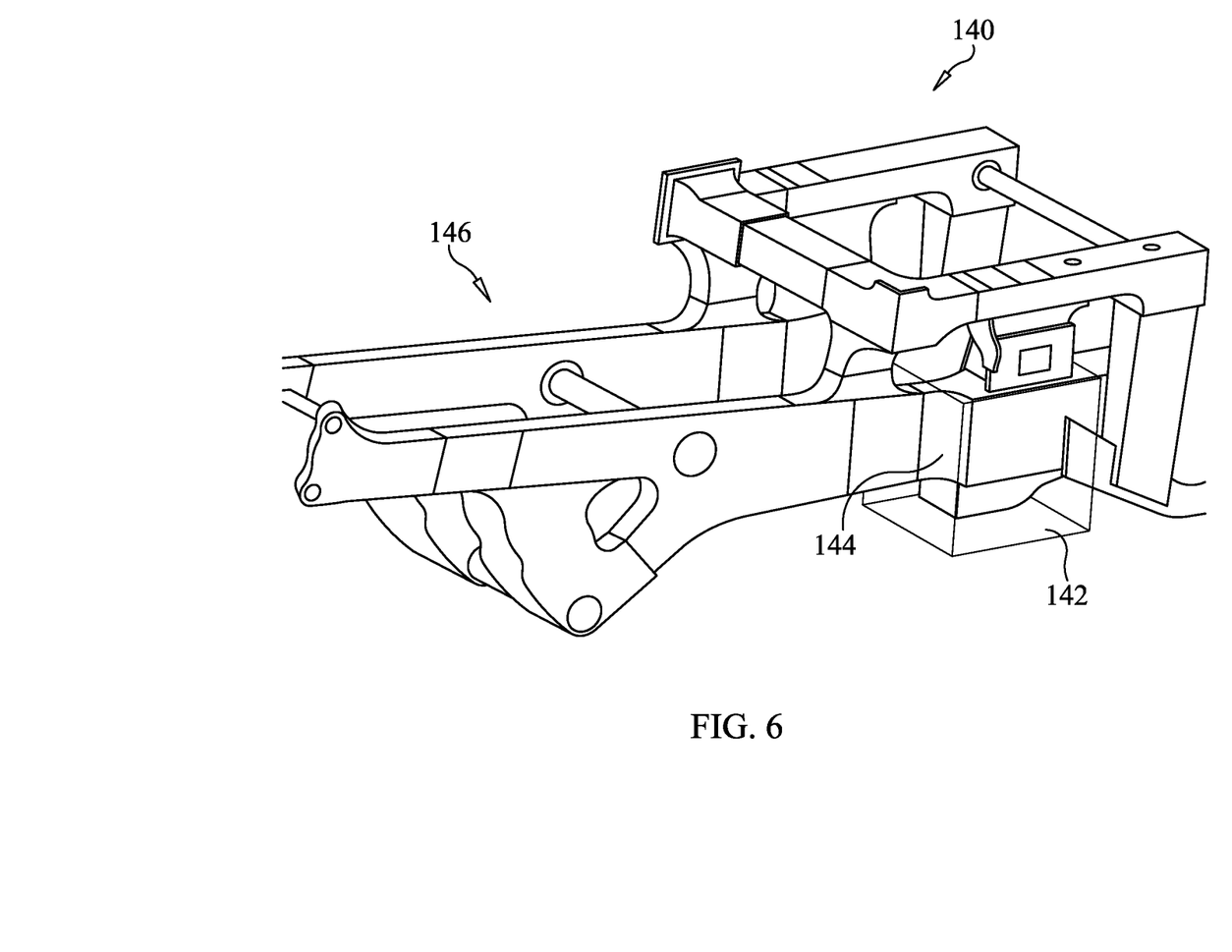
FIG. 6 is an exemplary image of a 3D model, along with a bounding box surrounding one of the parts of the object, both of which may be used for generating the interactive 2D projection, according to another aspect of the present disclosure.

Regarding the data extracted from the first data visualization software program 28, an exemplary image 140, such as 2D image data of the 3D model 30, is shown generally in FIG. 6. Also shown is a bounding box 142 of one part 144 of multi-part object 146. It should be appreciated that a bounding box, which is known to those skilled in the art, will be extracted for each part of the multi-part object 146. However, the coordinates of each bounding box 142 are not appropriately translated to the 2D space given other world coordinate parameters.

Figures 7, 8:
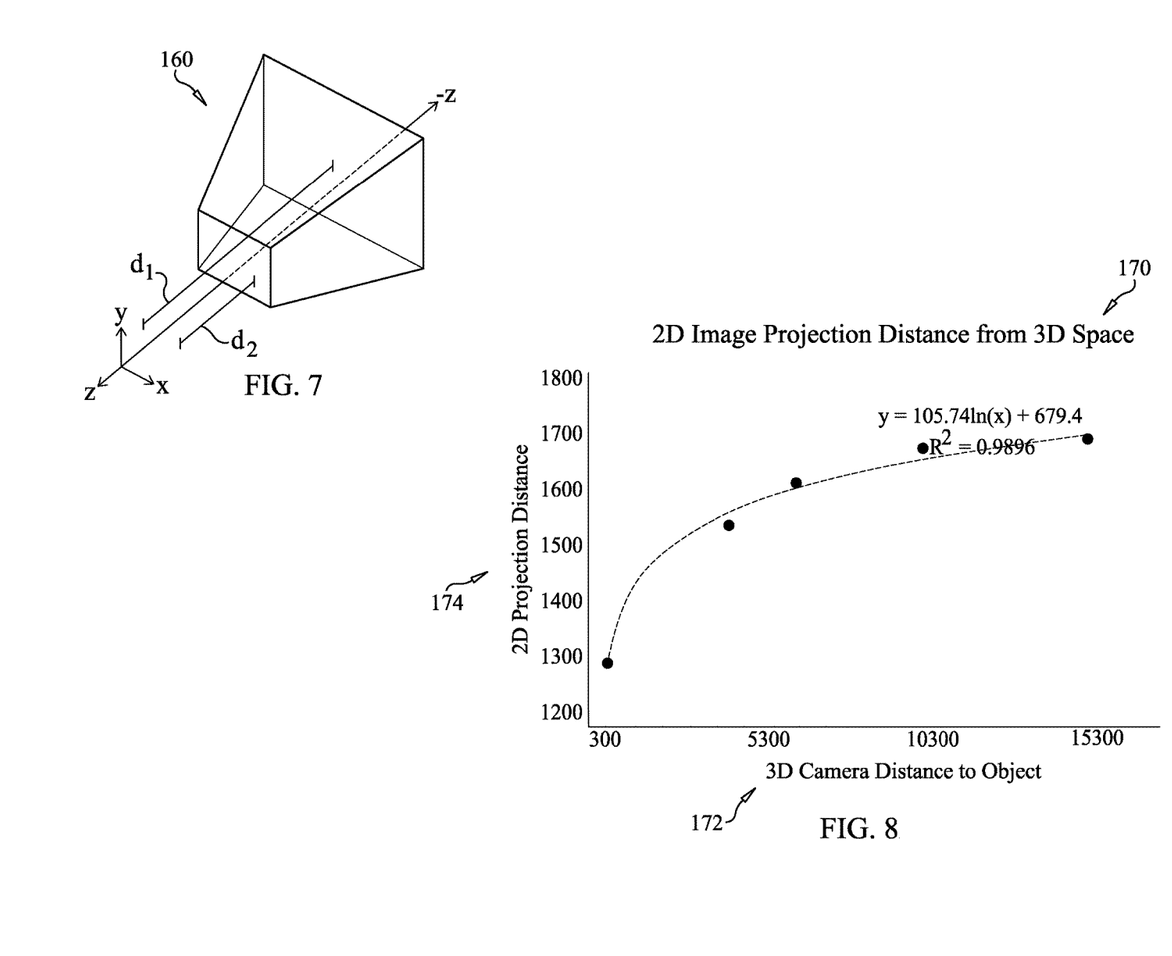
FIG. 7 is a trapezoid shown to illustrate a camera-to-solid model distance and a camera-to-canvas distance, according to another aspect of the present disclosure.
FIG. 8 is a chart representation of an estimation of a camera-to-canvas distance for each part, which may also be used for generating the interactive 2D projection, according to another aspect of the present disclosure.

That is, typically, or according to conventional systems, and with reference to a trapezoid 160 shown in FIG. 7, a camera-to-solid model distance $d_1$ is calculated and/or available to the first data software visualization software program 28 and/or the second data software visualization software program 42. However, to generate the interactive 2D projection disclosed herein a camera-to-canvas distance $d_2$ is needed.

Turning now to FIG. 8, a model 170 of translation ratios used to convert the camera-to-solid model distance $d_1$ 172 to the camera-to-canvas distance $d_2$ 174 is provided. The translation ratios may be estimates to fit the 3D coordinates to the 2D space. In particular, a 2D image, similar to the exemplary image 140, such as 2D image data of the 3D model 30, and including pixel height and width of the image, the 3D coordinates of the bounding box 142 (including 6 axis points per part: x-min/max, y-min/max, z-min/max), along with the camera-to-solid model distance $d_1$ 172 are used by the model 170 to translate these inputs into 2 x/y coordinate pairs to represent the bounding box, such as bounding box 142, of each part in 2D space.

Figure 9:
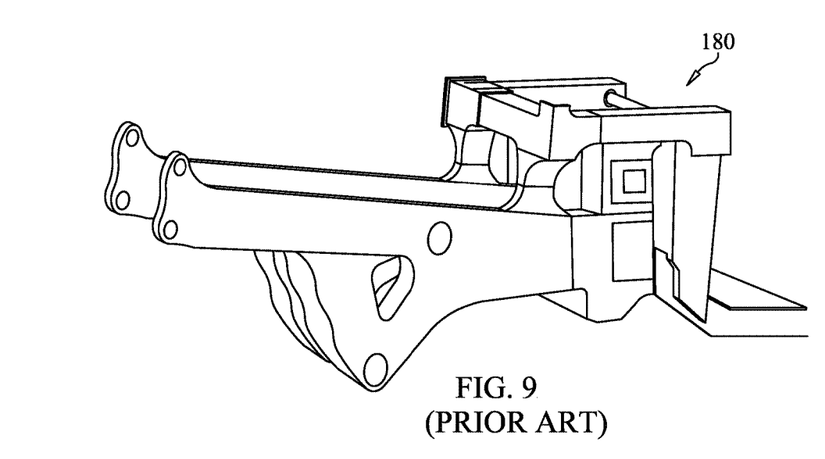
FIG. 9 is an exemplary 2D image generated according to a prior art system.
Figure 10:
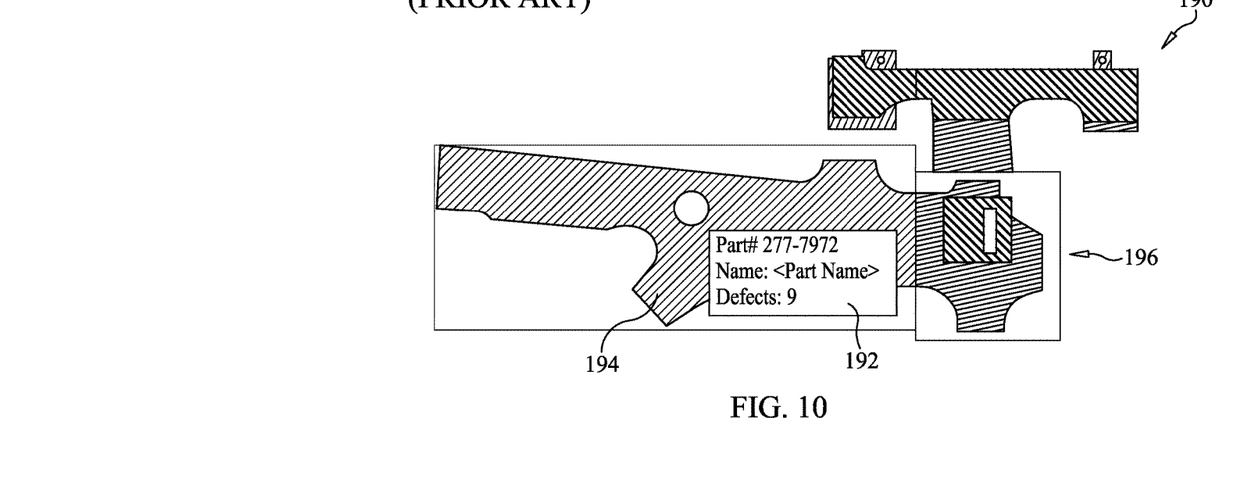
FIG. 10 is an exemplary interactive 2D projection generated according to the system and method disclosed herein.

FIG. 9 is an exemplary 2D view 180 generated according to a prior art system. That is, the prior art 2D view 180 may be a typical representation of a 2D view or image created based on a 3D model. According to the present disclosure, and as shown in FIG. 10, the system and method disclosed herein may generate an interactive 2D projection 190 based on a 3D model. Further, defect information, as described above including the hierarchical defect data, may be provided in an information window 192, such as when hovering over a particular part 194 of a multi-part object 196.

INDUSTRIAL APPLICABILITY

The present disclosure is applicable to systems and methods for creating 2D views and 3D models of objects. More particularly, the present disclosure is applicable to applying hierarchical defect data to heatmap data applied to 3D models. Yet further, the present disclosure is applicable to systems and methods for generating interactive 2D projections, including the hierarchical defect data, based on the 3D models. In particular, 2D views and 3D models are commonly used in manufacturing, such as during product development and analysis. Since both views are useful, the present disclosure is directed to accurately applying defect data to the 3D models prior to generating 2D views or projections.

Figure 11:
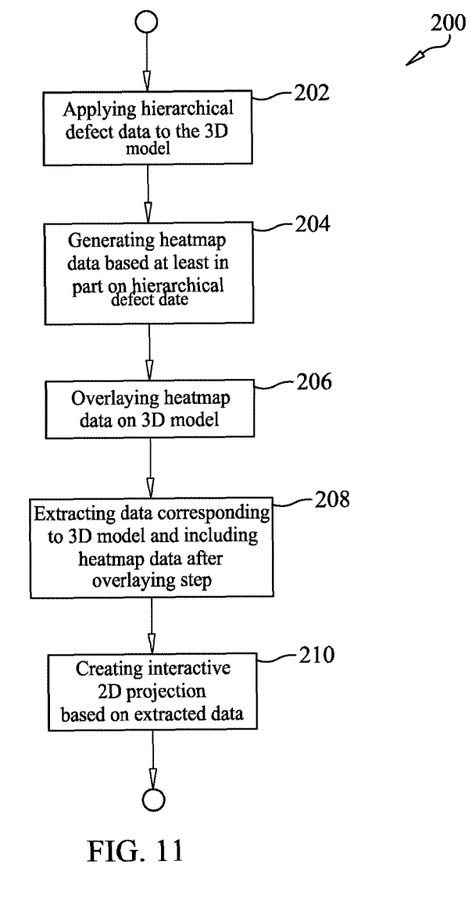
FIG. 11 is a flow diagram illustrating, at a high level, an exemplary method for generating the interactive 2D projection, according to the present disclosure.

Referring generally to FIGS. 1-10 and more specifically to FIG. 11, the present disclosure is directed to a system and method for generating an interactive 2D projection of a 3D model. Turning to the flow diagram 200 of FIG. 11, and referring to Block 202, the method, at a high level, includes a step of applying hierarchical defect data to the 3D model. At Block 204, the method also includes generating heatmap data based at least in part on hierarchical defect data. The heatmap data is overlayed on the 3D model, at Block 206. At Block 208, data corresponding to the 3D model and including the heatmap data is extracted, with this step occurring after the step at Block 206. Finally, the method includes a step of creating an interactive 2D projection based on the extracted data, at Block 210.

To reiterate, the present disclosure includes a system and method for applying hierarchical defect data to a 3D model.

A model is used to fit the 3D coordinates to 2D space in order for the interaction in the 2D space to work and be aligned properly. Further, the hierarchical defect data is shifted outside of the 3D environment and into the 2D space for more wide scale availability.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method for generating an interactive 2D projection of a 3D model,
   wherein the method is performed by one or more processing devices, the method comprising:
   applying hierarchical defect data to the 3D model of a multi-part object, the hierarchical defect data includes a defect count applied to a child/parent pair of parts;
   generating heatmap data based at least in part on the hierarchical defect data;
   overlaying the heatmap data on the 3D model;
   extracting data corresponding to the 3D model and including the heatmap data after the overlaying step; and
   creating the interactive 2D projection based on the extracted data that includes the hierarchical defect data for the child/parent pair of parts.

2. The method of claim 1, further including using a translation model to convert the extracted data to the interactive 2D projection.

3. The method of claim 2, wherein generating the translation model includes estimating a camera-to-canvas distance for each part of the 3D model being converted to the interactive 2D projection.

4. The method of claim 1, wherein the applying step includes applying defect data to the 3D model from a bill of materials.

5. The method of claim 1, further including using an automation to perform the applying step.

6. The method of claim 1, wherein the extracting step includes extracting:
   2D image data; bounding box coordinates of each part of the 3D model being converted to the interactive 2D projection; and a camera-to-solid model surface distance for each part.

7. The method of claim 1, further including displaying the 3D model on a first computer display using a first data visualization software program.

8. The method of claim 1, further including displaying the interactive 2D model on a second computer display using a second data visualization software program.

9. The method of claim 1, further including integrating first and second data visualization software programs such that a modification in one of the first and second data visualization software programs is reflected in a second of the first and second data visualization software programs.

10. A system comprising:
    at least one processing device, the processing device being programmed for generating an interactive 2D projection of a 3D model, the processing device being programmed for executing the steps of:
    applying hierarchical defect data to the 3D model of a multi-part object;
    generating heatmap data based at least in part on the hierarchical defect data, the hierarchical defect data includes a defect count applied to a child/parent pair of parts;
    overlaying the heatmap data on the 3D model;
    extracting data corresponding to the 3D model and including the heatmap data after the overlaying step; and
    generating the interactive 2D projection based on the extracted data that includes the hierarchical defect data for the child/parent pair of parts.

11. The system of claim 10, wherein the processor is further programmed to utilize a translation model to convert the extracted data to the interactive 2D projection.

12. The system of claim 11, wherein the translation model includes an estimation of a camera-to-canvas distance for each part of the 3D model being converted to the interactive 2D projection.

13. The system of claim 10, wherein the hierarchical defect data is extracted from a bill of materials.

14. The system of claim 10, wherein the processor is further programmed to automate the step of applying the hierarchical defect data.

15. The system of claim 10, wherein the extracted data includes: 2D image data; bounding box coordinates of each part of the 3D model being converted to the interactive 2D projection; and a camera-to-solid model distance for each part.

16. The system of claim 10, further including a first data visualization software program for displaying the 3D model on a first computer display.

17. The system of claim 16, further including a second data visualization software program for displaying the interactive 2D model on a second computer display.

18. The system of claim 17, wherein the first and second data visualization software programs are integrated such that a modification in one of the first and second data visualization software programs is reflected in a second of the first and second data visualization software programs.

19. A method for generating an interactive 2D projection of a 3D model,
    wherein the method is performed by one or more processing devices, the method comprising:
    applying manufacturing metadata to the 3D model of a multi-part object, the manufacturing metadata including hierarchical defect data including a defect count applied to a child/parent pair of parts;
    generating heatmap data based at least in part on the manufacturing metadata;
    overlaying the heatmap data on the 3D model;
    extracting data corresponding to the 3D model and including the heatmap data after the overlaying step; and
    creating the interactive 2D projection based on the extracted data that includes the hierarchical defect data for the child/parent pair of parts.

20. The method of claim 19, wherein the manufacturing metadata includes hierarchical heatmap data.

* * * * *